US010785110B2

(12) United States Patent
Torrence et al.

(10) Patent No.: US 10,785,110 B2
(45) Date of Patent: **\*Sep. 22, 2020**

(54) AUTOMATED CHANGE APPROVAL

(71) Applicant: Tripwire, Inc., Portland, OR (US)

(72) Inventors: Gregor Torrence, Portland, OR (US); Troy D. Thompson, Lafayette, OR (US)

(73) Assignee: Tripwire, Inc., Portland, OR (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/620,765

(22) Filed: Jun. 12, 2017

(65) Prior Publication Data

US 2018/0069756 A1    Mar. 8, 2018

Related U.S. Application Data

(63) Continuation of application No. 13/196,666, filed on Aug. 2, 2011, now Pat. No. 9,680,707, which is a
(Continued)

(51) Int. Cl.
*H04L 12/24* (2006.01)

(52) U.S. Cl.
CPC ........ *H04L 41/0866* (2013.01); *H04L 41/082* (2013.01); *H04L 41/0843* (2013.01)

(58) Field of Classification Search
None
See application file for complete search history.

(56) References Cited

U.S. PATENT DOCUMENTS

| | | |
|---|---|---|
| 5,655,081 A | 8/1997 | Bonnell et al. |
| 5,787,409 A | 7/1998 | Seiffert et al. |
| (Continued) | | |

FOREIGN PATENT DOCUMENTS

| | | |
|---|---|---|
| GB | 2356524 | 5/2001 |
| WO | WO 00/75782 | 12/2000 |

OTHER PUBLICATIONS

Kim et al., "The Design and Implementation of Tripwire: A File System Integrity Checker," *Computer Science Technical Reports*, 23 pp. (1993).
(Continued)

*Primary Examiner* — Davoud A Zand
(74) *Attorney, Agent, or Firm* — Klarquist Sparkman, LLP

(57) ABSTRACT

An automated method for facilitating management of a data processing environment is disclosed. In various embodiments, the method may include facilitating creation of a first memorialization, in digital form, of first one or more changes made to a first data processing device of the data processing environment. In various embodiments, the method may further include facilitating creation of a second and a third memorialization, both in digital form, of second and third one or more changes made to a second and a third data processing device of the data processing environment, respectively. In various embodiments, the method may still further include facilitating automated approval of the second and third changes made to the second and third data processing devices, using the first, second and third memorializations. Other embodiments of the present invention may include, but are not limited to, apparatus adapted to facilitate practice of the above-described method.

21 Claims, 8 Drawing Sheets

Related U.S. Application Data continuation of application No. 11/097,680, filed on Mar. 31, 2005, now abandoned.

(56) References Cited

U.S. PATENT DOCUMENTS

| | | | |
|---|---|---|---|
| 5,805,819 A | 9/1998 | Chin et al. | |
| 5,832,489 A | 11/1998 | Kucala | |
| 5,872,928 A | 2/1999 | Lewis et al. | |
| 5,872,931 A | 2/1999 | Chivaluri | |
| 5,878,408 A | 3/1999 | Van Huben et al. | |
| 5,884,323 A | 3/1999 | Hawkins et al. | |
| 5,892,900 A | 4/1999 | Ginter et al. | |
| 5,910,987 A | 6/1999 | Ginter et al. | |
| 6,041,347 A | 3/2000 | Harsham et al. | |
| 6,058,455 A * | 5/2000 | Islam | G06F 11/1096 710/10 |
| 6,064,656 A | 5/2000 | Angal et al. | |
| 6,122,664 A | 9/2000 | Boukobza et al. | |
| 6,272,537 B1 | 8/2001 | Kekic et al. | |
| 6,295,541 B1 | 9/2001 | Bodnar et al. | |
| 6,330,618 B1 | 12/2001 | Hawkins et al. | |
| 6,341,287 B1 | 1/2002 | Sziklai et al. | |
| 6,530,024 B1 | 3/2003 | Proctor | |
| 6,539,427 B1 | 3/2003 | Natarajan et al. | |
| 6,594,673 B1 | 7/2003 | Smith et al. | |
| 6,629,139 B1 | 9/2003 | Kennedy | |
| 6,647,400 B1 | 11/2003 | Moran | |
| 6,658,568 B1 | 12/2003 | Ginter et al. | |
| 6,664,978 B1 | 12/2003 | Kekic et al. | |
| 6,697,962 B1 | 2/2004 | McCrory et al. | |
| 6,742,114 B1 | 5/2004 | Carter et al. | |
| 6,779,120 B1 | 8/2004 | Valente et al. | |
| 6,853,987 B1 * | 2/2005 | Cook | G06Q 20/027 705/64 |
| 6,877,051 B2 | 4/2005 | Iwanojko et al. | |
| 6,971,018 B1 | 11/2005 | Witt et al. | |
| 7,013,313 B1 | 3/2006 | LaRue | |
| 7,024,548 B1 | 4/2006 | O'Toole, Jr. | |
| 7,039,639 B2 | 5/2006 | Brezin et al. | |
| 7,043,659 B1 | 5/2006 | Klein et al. | |
| 7,051,050 B2 | 5/2006 | Chen et al. | |
| 7,065,767 B2 | 6/2006 | Kambhammettu et al. | |
| 7,095,854 B1 | 8/2006 | Ginter et al. | |
| 7,237,138 B2 | 6/2007 | Greenwald et al. | |
| 7,397,770 B2 | 7/2008 | Le et al. | |
| 7,516,157 B2 | 4/2009 | Cameron et al. | |
| 7,624,443 B2 | 11/2009 | Kramer et al. | |
| 7,640,245 B1 | 12/2009 | Abdo et al. | |
| 7,693,958 B2 | 4/2010 | Teodosiu et al. | |
| 7,694,150 B1 * | 4/2010 | Kirby | G06F 21/55 713/188 |
| 7,756,825 B2 | 7/2010 | Khosravy et al. | |
| 8,140,635 B2 | 3/2012 | DiFalco | |
| 9,209,996 B2 | 12/2015 | DiFalco | |
| 9,680,707 B2 | 6/2017 | Torrence | |
| 2001/0044840 A1 | 11/2001 | Carleton | |
| 2002/0048369 A1 | 4/2002 | Ginter et al. | |
| 2002/0059137 A1 | 5/2002 | Freeman et al. | |
| 2002/0073139 A1 | 6/2002 | Hawkins et al. | |
| 2002/0078150 A1 | 6/2002 | Thompson et al. | |
| 2002/0133508 A1 | 9/2002 | LaRue et al. | |
| 2003/0018719 A1 * | 1/2003 | Ruths | G06F 9/52 709/205 |
| 2003/0069960 A1 | 4/2003 | Symons et al. | |
| 2003/0101341 A1 | 5/2003 | Kettler et al. | |
| 2003/0150908 A1 | 8/2003 | Pokorny et al. | |
| 2003/0150909 A1 | 8/2003 | Markham et al. | |
| 2003/0154144 A1 | 8/2003 | Pokorny et al. | |
| 2003/0155415 A1 | 8/2003 | Markham et al. | |
| 2003/0182327 A1 | 9/2003 | Ramanujam et al. | |
| 2003/0217134 A1 | 11/2003 | Fontoura et al. | |
| 2003/0233431 A1 | 12/2003 | Reddy et al. | |
| 2004/0003060 A1 | 1/2004 | Asoh et al. | |
| 2004/0006614 A1 | 1/2004 | DiFalco | |
| 2004/0024843 A1 | 2/2004 | Smith | |
| 2004/0054630 A1 | 3/2004 | Ginter et al. | |
| 2004/0059930 A1 | 3/2004 | DiFalco et al. | |
| 2004/0060046 A1 | 3/2004 | Good et al. | |
| 2004/0122962 A1 | 6/2004 | DiFalco et al. | |
| 2004/0123133 A1 | 6/2004 | DiFalco et al. | |
| 2004/0128321 A1 | 7/2004 | Hamer | |
| 2004/0133793 A1 | 7/2004 | Ginter et al. | |
| 2004/0148317 A1 | 7/2004 | Sundararajan et al. | |
| 2004/0186903 A1 | 9/2004 | Lambertz | |
| 2004/0199615 A1 | 10/2004 | Philyaw | |
| 2005/0004928 A1 | 1/2005 | Hamer et al. | |
| 2005/0027817 A1 | 2/2005 | Novik et al. | |
| 2005/0086272 A1 | 4/2005 | Novik et al. | |
| 2005/0177716 A1 | 8/2005 | Ginter et al. | |
| 2005/0188219 A1 * | 8/2005 | Annic | H04L 41/00 726/22 |
| 2005/0256907 A1 | 11/2005 | Novik et al. | |
| 2005/0267966 A1 | 12/2005 | Boston | |
| 2005/0278191 A1 | 12/2005 | DiFalco et al. | |
| 2006/0190572 A1 | 8/2006 | Novik et al. | |
| 2006/0242277 A1 | 10/2006 | Torrence et al. | |
| 2007/0022365 A1 | 1/2007 | DiFalco et al. | |
| 2009/0248905 A1 * | 10/2009 | Kishimoto | G06F 3/0622 710/8 |
| 2012/0027093 A1 | 2/2012 | Amon et al. | |
| 2013/0155451 A1 | 6/2013 | Nakahara | |

OTHER PUBLICATIONS

Kim et al., "Experiences with Tripwire: Using Integrity checkers for Intrusion Detection," *Computer Science Technical Reports*, 15 pp. (1994).

Yu et al., *The Impacts of Electronic Commerce on Auditing Practices: An Auditing Process Model for Evidence Collection and Validation*, John Wiley & Sons, Ltd. pp. 195-216 (2000).

U.S. Appl. No. 60/494,225, filed Aug. 11, 2003, Hooks et al.

Almgren et al., "Application-Integrated Data Collection for Security Monitoring," *Recent Advances in Intrusion Detection*, pp. 22-36 (Oct. 2001).

Burgess, "A Site Configuration Engine," *Computing Systems*, vol. 8, No. 3, pp. 309-337 (1995).

Cheung et al., "The Design of GrIDS: A Graph-Based Intrusion Detection System," *Proc. National Information Systems Security Conf.*, 49 pp. (Jan. 1999).

Cisco Systems, "Overview of RME," 389 pp. (Mar. 2005).

Cisco Systems, "Technology Best Practices for Endpoint Security," White Paper, pp. 1-3 (2003).

Configuresoft, "ECM: Enterprise Configuration Manager," 2 pp. (2000).

Crosbie et al., "A Building Block Approach to Intrusion Detection," *RAID Symp.*, 14 pp. (Sep. 7, 2001).

Feldmann et al., "IP Network Configuration for Intradomain Traffic Engineering," *IEEE Network*, pp. 46-57 (Sep. 2001).

Kerio Technologies, "Kerio Network Monitor 2.0—User's Guide," 68 pp. (Jun. 2002).

Lindqvist et al., "Detecting Computer and Network Misuse Through the Production-Based Expert System Toolset (P-BEST)," *IEEE Symp. on Security and Privacy*, pp. 1-16 (May 1999).

Lindqvist et al., "eXpert-BSM: A Host-based Intrusion Detection Solution for Sun Solaris," *Proc. Computer Security Applications Conf.*, pp. 240-251 (Dec. 2001).

NetScreen-Global Manager, "User's Guide," Version 2.6, Rev. C, 242 pp. (2001).

Neumann et al., "Experience with EMERALD to DATE," USENIX Workshop on Intrusion Detection and Network Monitoring, pp. 73-80 (Apr. 1999).

Porras et al., "EMERALD: Event Monitoring Enabling Responses to Anomalous Live Disturbances," *National Information Systems Security Conf.*, pp. 1-13 (Oct. 1997).

Ressman et al., "Use of Cfengine for Automated, Multi-Platform Software and Patch Distribution," *LISA Proc. of USENIX Conf. on System Administration*, pp. 207-218 (Dec. 2000).

(56) References Cited

OTHER PUBLICATIONS

Staniford-Chen et al,. "GrIDS—A Graph Based Intrusion Detection System for Large Networks," *Proc. National Information Systems Security Conf.*, 10 pp. (1996).
Tripwire, Inc., "Tripwire for Servers User Guide 2.4," pp. 101 (2001).
Tripwire, Inc., "Tripwire Manager—Centralized Management of Data & Network Integrity," 2 pp. (2001).
Tripwire, Inc., "Tripwire Reference Guide 2.4," pp. 1-127 (2001).
Tripwire, Inc., "Tripwire Ships Latest Version of Award Winning Data and Network Integrity Software," Press Release, pp. 1-2 (Apr. 2001).
Wang et al., "Persistent-state Checkpoint Comparison for Troubleshooting Configuration Failures," *Int'l Conf. on Dependable Systems and Networks*, 6 pp. (2003).
BigFix, Inc., "BigFix Enterprise Suite—Upload and Archive Manager," Version 4.1, 13 pp. (Mar. 2004).
Cisco Systems, "Cisco Security Agent," Data Sheet, 7 pp. (2003).
Cisco Systems, "Cisco Security Agent V4.0," Evaluation Guide, 31 pp. (2003).
Cisco Systems, "Cisco Security Agent Profiler," 4 pp. (2003).
Cisco Systems, "Cisco Security Agent ROI: Deploying Intrusion Protection Agents on the Endpoint," White paper, 4 pp. (2003).
Cisco Systems, "Cisco Security Agent with Intrusion Protection for Remote Corporate Users," White Paper, 9 pp. (2003).
AlterPoint, Inc., Various datasheets and White Papers, 32 pp. (earliest dated Aug. 2003).
Axent Technologies, Inc., "NetProwler User Manual, Version 3.0," 388 pp. (May 1999).
BigFix, Inc., "BigFix Enterprise Suite—Administrator's Guide," Version 4.1, 63 pp. (Mar. 2004).
Cisco Systems, "Securing Network Endpoints Without signatures: A Policy-Based Approach to Host Intrusion Protection," White Paper, 12 pp. (2003).
Cisco Systems, "User Guide for Resource Manager Essentials 4.0," 389 pp. (Mar. 2005).
"CyberCop Monitor Getting Started Guide," Version 2.0, 76 pp. (1999).
CyberSafe Corporation, "Centrax Version 3.1 User's Guide," 175 pp. (Jun. 2001).
Gartner, Inc., "Cisco Systems Intrusion Detection System," DPRO-93505, 25 pp. (Oct. 2003).
Gold Wire Technology, "Formulator Compliance Manager," 60 pp. (Jun. 2004).
Hewlett-Packard Company, "HP Intrusion Detection System/9000 Administrator's Guide," Software Release 2.0, Edition 2, 224 pp. (Dec. 2001).
Hewlett-Packard Company, "Managing Your Network with HP OpenView Network Node Manager," 658 pp. (Mar. 2001).
IBM, "A First Look at TME 10 Distributed Monitoring 3.5," SG24-2112-00, 108 pp. (Jul. 1997).
IBM, "An Introduction to Tivoli's TME 10," SG24-4948-01, 328 pp. (Sep. 1997).
IBM, "Tivoli Distributed Monitoring User's Guide, Version 3.7," 412 pp. (2001).
Intelliden Corporation, Various articles, 27 pp. (earliest dated Jun. 2004).
Internet Security Systems, Inc., "Database Scanner Getting Started Guide," Version 4, 62 pp. (May 2000).
Internet Security Systems, Inc., "Internet Scanner Getting Started Guide," Version 6.1, 54 pp. (Jul. 2000).
Internet Security Systems, Inc., "RealSecure Network Sensor Policy Guide," Version 6.5, 536 pp. (Nov. 2001).
Internet Security Systems, Inc., "Real-time attack recognition and response: A solution for tightening network security," 47 pp. (Jul. 1997).
Intrusion.com, "Building an Enterprise Security Infrastructure: Introduction to Kane Secure Enterprise," 18 pp. (Mar. 2000).
Microsoft Corporation, "Systems Management Server Version 2.0—Scalable Management for Windows Based Systems," Reviewer's Guide, 97 pp. (1998).
"NerveCenter 3.6: An Overview," 57 pp. (Aug. 2000).
Novadigm, Inc., "Enterprise Desktop Manager," 2 pp. (1997).
Novadigm, Inc., "Enterprise Desktop Manager (EDM) Version 4.0," 4 pp. (2000).
Novell, Inc., "ManageWise 2.6—Network Management Guide," 492 pp. (Aug. 1998).
Okena, "A New Approach to Intrusion Detection: Intrusion Prevention," Intrusion Prevention White Paper, 12 pp. (document not dated).
Okena, "StormWatch Configuration Guide V3.2," 356 pp. (2002).
Opsware, Inc., "Opsware System 4.0 Solution Guide—Automating IT Operations," 24 pp. (2003).
Opsware, Inc., "What It Means to Automate IT Operations," 20 pp. (2003).
"Patch Management Using Microsoft Systems Management Server 2003, Chapter 2—Solution Guidance," Microsoft TechNet, 61 pp. (2003).
"Patch Management Using Microsoft Systems Management Server 2003, Chapter 4—Appendices," Microsoft TechNet, 31 pp. (2003).
Rendition Networks, "Product Overview," 23 pp. (Sep. 2004).
Symantec Corporation, "Symantec Intruder Alert 3.6.1 Administration Guide," 306 pp. (2005).
The NSS Group, "Intrusion Detection Systems," Group Test (Edition 2), an NSS Group Report, 243 pp. (Dec. 2001).
Trend Micro Incorporated, "Trend Micro ServerProtect 5 Administrator's Guide," 284 pp. (Aug. 2001).
Voyence, Various articles, 215 pp. (earliest dated May 2003).

\* cited by examiner

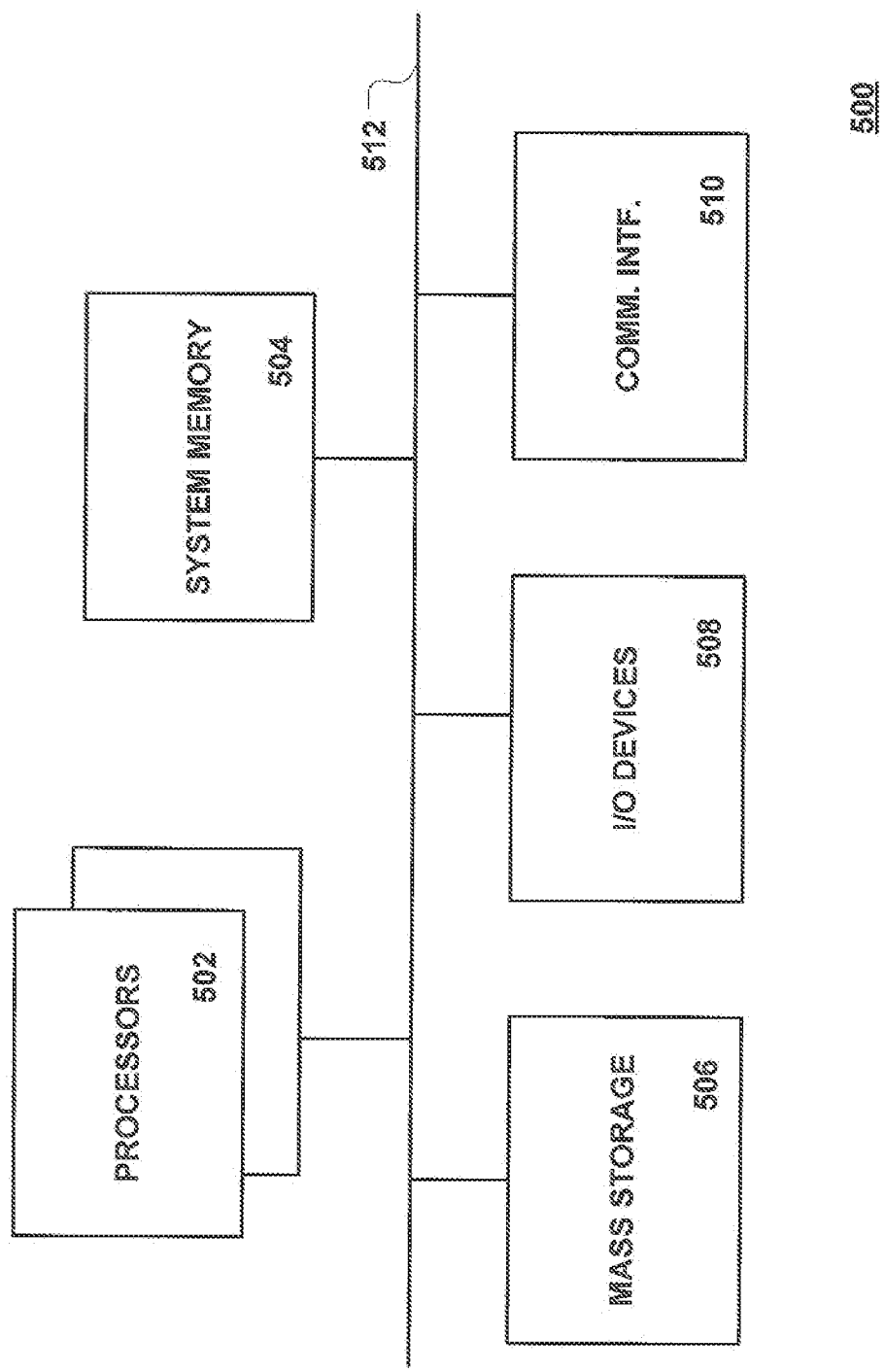

AUTOMATED CHANGE APPROVAL

CROSS REFERENCE TO RELATED APPLICATIONS

This application is a continuation of U.S. patent application Ser. No. 13/196,666, filed Aug. 2, 2011, entitled "Automated Change Approval," which is a continuation of U.S. patent application Ser. No. 11/097,680, filed Mar. 31, 2005, entitled "Automated Change Approval," both of which are hereby incorporated by reference in their entirety.

FIELD

Disclosed embodiments of the present invention relate generally to the field of data processing, and more particularly to automated change approval in data processing environments.

BACKGROUND

Data processing devices are deployed in many different configurations and are used for many different applications in a variety of data processing environments. In some configurations, data processing devices may be grouped for various reasons. For example, using servers as illustrative data processing devices, servers may reside together in a server farm. A server farm may streamline internal processes by distributing the workload among the individual servers of the farm and may expedite computing processes by harnessing the abilities of multiple servers. Groups of servers in server farms may be identical, or similar in certain operational respects, for a variety of reasons, including mirror servers, back-up servers, etc. While multiple servers may initially commence operation with identical, or similar, operational states, varying changes may occur, either by design, inadvertently, or otherwise, among the multiple servers. Similar situations may arise among a wide variety of data processing devices, including but not limited to switches, routers, and other networking devices of the like.

BRIEF DESCRIPTION OF THE DRAWINGS

Embodiments of the invention are illustrated by way of example and not by way of limitation in the figures of the accompanying drawings, in which like references indicate similar elements and in which:

FIG. 5 illustrates an example computer system suitable for use in association with automated change approval, in accordance with various embodiments of this invention.

DETAILED DESCRIPTION OF ILLUSTRATIVE EMBODIMENTS

Figure 1:
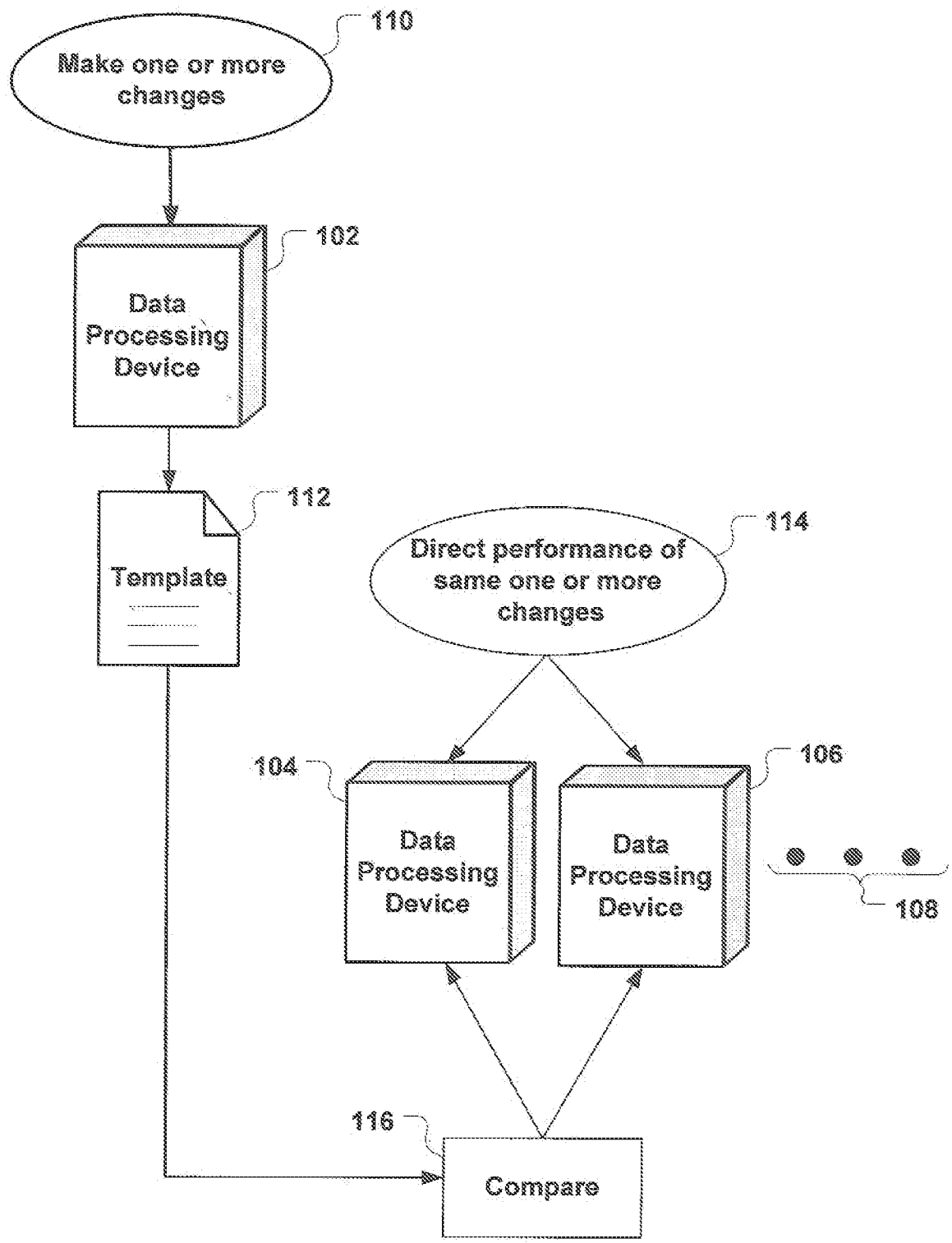
FIG. 1 illustrates a method view of the present invention, in accordance with various embodiments of this invention.

Embodiments of the present invention include, but are not limited to, an automated method for facilitating management of a data processing environment. In various embodiments, the method may include facilitating creation of a first memorialization, in digital form, of first one or more changes made to a first data processing device of the data processing environment. In various embodiments, the method may further include facilitating creation of a second and a third memorialization, both in digital form, of second and third one or more changes made to a second and a third data processing device of the data processing environment, respectively. In various embodiments, the method may still further include facilitating automated approval of the second and third changes made to the second and third data processing devices, using the first, second and third memorializations. Other embodiments of the present invention may include, but are not limited to, apparatus adapted to facilitate practice of the above-described method. The following discussion is primarily presented in the context of computers. It is understood that the principles described herein may apply to other data processing devices, including but not limited switches, routers, and other networking equipment of the like.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Parts of the descriptions of various embodiments will be presented in terms of operations performed by a processor-based device, using terms such as data and the like, consistent with the manner commonly employed by those skilled in the art to convey the substance of their work to others skilled in the art. As well understood by those skilled in the art, the quantities may take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising," "having" and "including" are synonymous, unless the context dictates otherwise.

Some embodiments of the present invention include a scalable architecture to facilitate automated change approval of changes in data processing devices. Such data processing devices may include but are not limited to servers, desktop computers, laptop computers, tablet computers, networking devices, personal data assistants (PDA), cellular phones, set top boxes, media players, or other types of data processing devices.

FIG. 1 illustrates a method view of the present invention, in accordance with various embodiments of this invention. As shown, for the embodiments, the method may be practiced to facilitate management of a data processing environment having, for example, data processing devices 102, 104 and 106. In various embodiments, data processing device 102 may comprise a test server. Data processing devices 104 and 106 may comprise various production servers. In various other embodiments, data processing devices 104 and 106 may comprise other types of data processing devices, such as, desktop computers, laptop computers, tablet computers, networking devices of like kind, personal data assistants (PDAs), cellular phones, set top boxes, media players, or the like. In various embodiments, data processing device 102 may comprise a different type of data processing device other than a test server. In some embodiments, data processing devices 104 and 106 may represent two different types of data processing devices.

Illustrating a portion of a possible operational context in some embodiments, first one or more changes may be made to data processing device 102, as illustrated by block 110. In various embodiments, one or more modules incorporated with the teachings of this invention (to be described more fully below) may facilitate creation of a first memorialization, in digital form, of the first one or more changes made to a first data processing device, which may be represented by data processing device 102. In various embodiments, the first memorialization may comprise a record or template, which may be represented by template 112. In some embodiments, such a template may consist of a file, such as a binary report file or a plain text file. In other embodiments, such a template may consist of a different type of digital memorialization.

Illustrating a portion of a possible operational context in some embodiments, the same one or more changes made to data processing device 102 may be directed to be performed to data processing devices 104 and 106, as illustrated by block 114. In various embodiments, the one or more modules may facilitate creation of a second and a third memorialization of second and third one or more changes made to a second and a third data processing device of the data processing environment, which may be respectively represented by data processing devices 104 and 106. In various embodiments, the one or more modules may facilitate automated approval of the second and third changes made to the second and third data processing devices, using the first, second and third memorializations. In some embodiments, such use of the first, second and third memorializations may comprise a comparison of template 112 to a memorialization (not shown) of the changes made to data processing device 104, as well as a comparison of template 112 to a memorialization (not shown) of the changes made to data processing device 106, as illustrated by block 116. In some embodiments, if the respective memorializations of the respective changes match, then the second and third changes may be automatically approved. For example, if the second memorialization matches the first memorialization, then the second changes made to data processing device 104 may be automatically approved. For example, if the third memorialization matches the first memorialization, then the third changes made to data processing device 106 may be automatically approved. In other embodiments, such use of the first, second and third memorializations may comprise other uses of said memorializations.

Graphic 108 illustrates that there may be any number of data processing devices (not shown) grouped, either explicitly or implicitly, with data processing devices 104 and 106, according to various embodiments. Such a grouping may not be present in various other embodiments. In some embodiments, such additional data processing devices may be grouped with data processing devices 104 and 106 and may be included in the operations represented by blocks 114 and 116. In some embodiments, such additional data processing devices may be grouped with data processing devices 104 and 106 for other operations (not shown) that may be performed on data processing devices 104 and 106. In some embodiments, such additional data processing devices may have other operations performed on them instead.

In various embodiments, the one or more modules may allow for said automated comparison of the second and third memorializations to the first memorialization to be performed substantially concurrently. In some embodiments, the one or more modules may facilitate the definition of the second and third data processing units as members of a group of data processing units, to facilitate said substantial concurrent performance of said second and third memorializations to the first memorialization. In various embodiments, said automated comparison of the second and third memorializations to the first memorialization may be performed in a manner other than substantially concurrently. In some embodiments, the one or more modules may facilitate the definition of data processing units as members of a group of data processing units.

In various embodiments, said facilitating of creation of the first memorialization by the one or more modules may comprise facilitating automated application of the first one or more changes to the first data processing device. In various embodiments, said facilitating of creation of the first memorialization by the one or more modules may comprise facilitating automated comparison of a pre-application of the first one or more changes state of the first data processing device to a post-application of the first one or more changes state of the first data processing device to create a first file of first one or more records of the application of said first one or more changes to said first one or more data processing device. In such a comparison, a difference between a pre-application state and a post-application state may be termed a violation in some contexts. In some embodiments, said one or more records may comprise of the violations detected. In various embodiments, said facilitating of creation of the first memorialization by the one or more modules may comprise performance of other operations.

In various embodiments, said facilitating of creation of the second memorialization by the one or more modules may comprise facilitating automated application of the second one or more changes to the second data processing device. In various embodiments, said facilitating of creation of the second memorialization by the one or more modules may comprise facilitating automated comparison of a pre-application of the second one or more changes state of the second data processing device to a post-application of the second one or more changes state of the second data processing device to create a second file of second one or more records of the application of said second one or more changes to said second data processing device. In various embodiments, said facilitating of creation of the second memorialization by the one or more modules may comprise performance of other operations.

In various embodiments, said facilitating of automated approval of the second and third changes made to the second and third data processing devices may comprise facilitating automated comparison of the second and third memorializations to the first memorialization. In various embodiments, said facilitating of automated approval of the second and third changes made to the second and third data processing devices may comprise other operations.

In various embodiments, the first, second and third memorializations may comprise files, as discussed above in relation to template 112 of FIG. 1 representing a file in some embodiments. In various other embodiments, the first, second and third memorializations may comprise memorializations other than files.

In various embodiments, said facilitating of comparison by the one or more modules may comprise facilitating automated comparison of a change to software or data in either the second or third data processing device, to a corresponding change to corresponding software or data of the first data processing device. In some embodiments, such a comparison may occur with at least the use of hashes made of the respective software residing on their respective data processing devices. In some embodiments, such a comparison may occur in another manner. An illustrative case of an embodiment making use of hashes may involve the memorializations described herein making use of hashes made of particular software or particular data both before and after the changes have been made. Such hashes may make use of any number of past, present, and future hashing algorithms consistent with the principles of an embodiment of this invention. Such hashing algorithms include, but are not limited to, MD5 (Message Digest 5), SHA-1 (Secure HASH Algorithm); and HAVAL (Hashing Algorithm with Variable Length).

In various embodiments, the one or more modules may facilitate definition in digital form of one or more responses to one or more detected differences during said automated comparison of the second and third memorializations to the first memorialization. In some embodiments, the one or more responses may include a no-action automatic approval response. For example, in some embodiments, a no-action automatic approval response may be applied in cases where a difference, or "violation," in either the second or third memorializations matches a difference, or "violation," in the first memorialization. In some embodiments, a no-action automatic approval response may be applied in cases where certain differences have been pre-approved, such as, for example, for acceptable differences known to arise on a certain data processing device. In some embodiments, a no-action automatic approval response may be applied in other cases.

In some embodiments, the one or more responses to one or more detected differences during said automated comparison of the second and third memorializations to the first memorialization may include an automatic remediation or alert response to a detected difference. For example, in some embodiments, an automatic remediation response may comprise of making a change to the second data processing device, where said change had been made to the first data processing device. This may occur when the first memorialization indicates such a change had been made to the first data processing device and the second memorialization indicates that such a change had not been made to the second data processing device. In some embodiments, where such a change had been made to the first data processing device and not to the second data processing device, an alert response notifying a user of such a detection may occur. In various embodiments, other responses may comprise either automatic remediation or alert responses to detected differences.

Figure 2A:
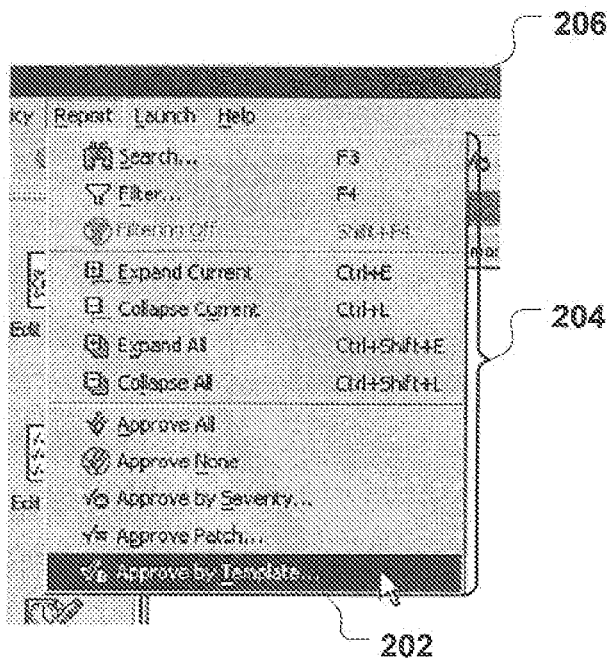
FIGS. 2a-2e illustrate various graphical user interface dialogs associated with specifying approval by template, provided by one or more modules equipped to facilitate practice of the methods of the invention, in accordance with various embodiments of this invention.
Figure 2B:

FIGS. 2*a*-2*e* illustrate various graphical user interface dialogs associated with specifying approval by template, provided by the one or more modules incorporated with the teachings of the present invention, in accordance with various embodiments of this invention. In other embodiments, different information may alternatively or additionally be displayed in such graphical user interface dialogs. In alternative other embodiments, other dialogs or their substantive equivalent may be provided. FIG. 2*a* illustrates the one or more modules providing option "Approve by Template" 202 in Report drop-down menu 204 of a portion of database update window 206, in accordance with an embodiment of this invention. FIG. 2*b* illustrates the one or more modules providing "Approve by Template" dialog window 220, in accordance with one embodiment of this invention. For the illustrated embodiments, "Approve by Template" dialog window 220 may include the following modes of determining how the template file is interpreted: "Object names and hashes must match" mode 222, "Only violated object names must match" mode 224, and "Only violated rule names must match" mode 226.

"Object names and hashes must match" mode 222 may comprise an operation where an opened violation will be approved if the template file has a violation in it with exactly the same object name and hash values, of the same type of violation: added, removed, or changed. "Only violated object names must match" mode 224 may comprise an operation that compares each violated object's name to see if the same name is in the template file. "Only violated rule names must match" mode 226 may comprise an operation where a violation is approved if it belongs to a rule where the template file also has a rule with the same name with violations.

Figures 2C, 2D:
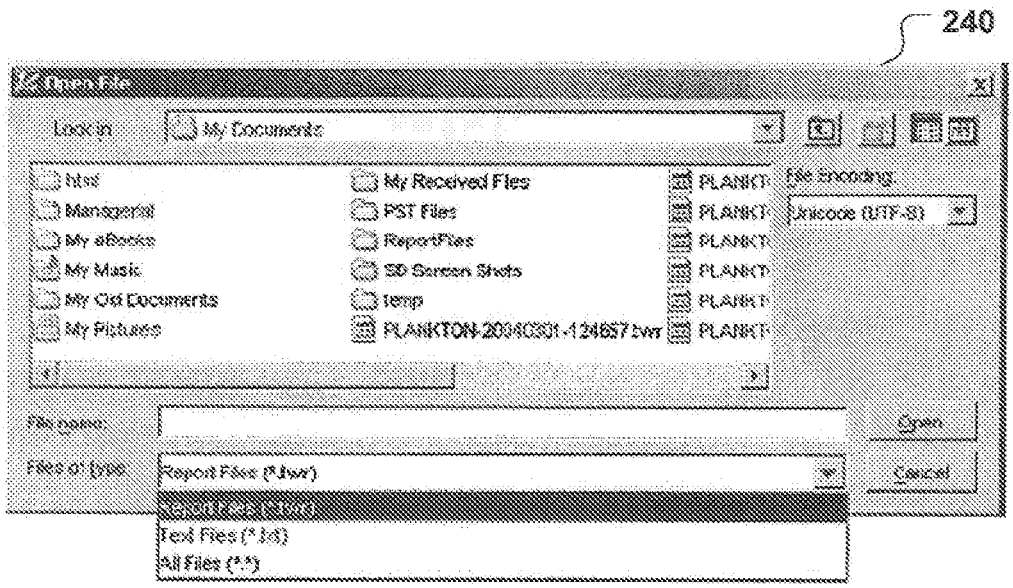

For the illustrated embodiments, "Approve by Template" dialog window 220 may include Template Report File Name input field 228 for the selection of a particular file to be used as a template. Browse button 230 may allow a user to specify a report file or a text file. When selecting a text file, it may be possible to specify the file's character encoding. "Approve by Template" dialog window 220 may include selection field 232 to allow a user to clear any approved violation already set before the approval by template operation is performed. FIG. 2*c* illustrates a possible dialog window 240 resulting from selecting browse button 230 of FIG. 2*b*, in accordance with an embodiment of this invention.

FIG. 2*d* illustrates a possible results dialog window 250 the one or more modules may employ for presentation of a report after approval is completed, in accordance with an embodiment of this invention. Results dialog window 250 may include Machine column 252, designating the machine compared with the template. Results dialog window 250 may include Approved column 254, designating approved violations. Results dialog window 250 may include Possible column 256, designating the total number of violations. Results dialog window 250 may include missing column 258, designating a violation in the template but not found in the report.

Figure 2E:
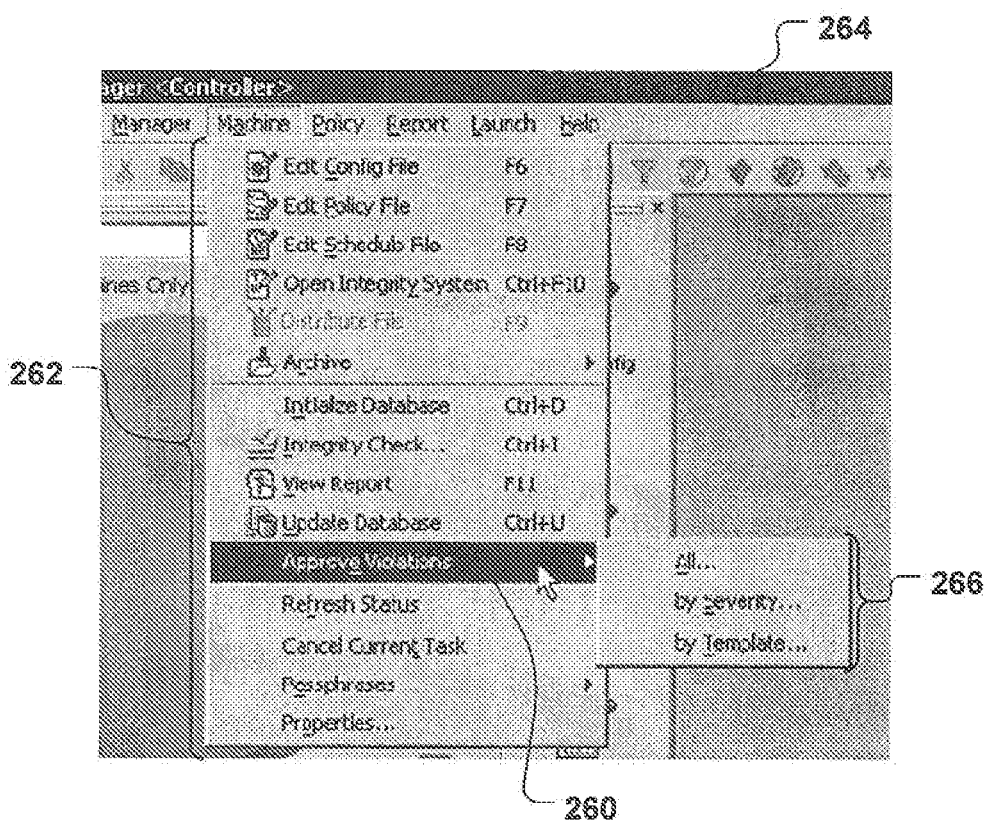

FIG. 2*e* illustrates the one or more modules providing option "Approve Violations" 260 in Machine drop-down menu 262 of a portion of database update window 264, as another way to direct an approval operation on selected machines, in accordance with an embodiment of this invention. "Approve Violations" 260 may include submenu 266 specifying different operations regarding how violations may be approved.

Figures 3A, 3B:
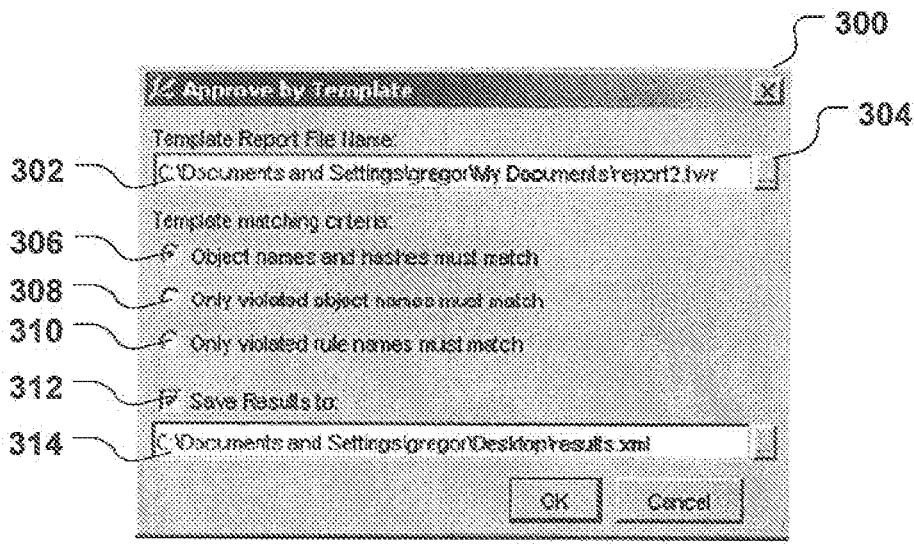
FIGS. 3a-3c illustrate various graphical user interface dialogs associated with specifying approval by template, provided by one or more modules equipped to facilitate practice of the methods of the invention, in accordance with various embodiments of this invention.
Figure 3C:
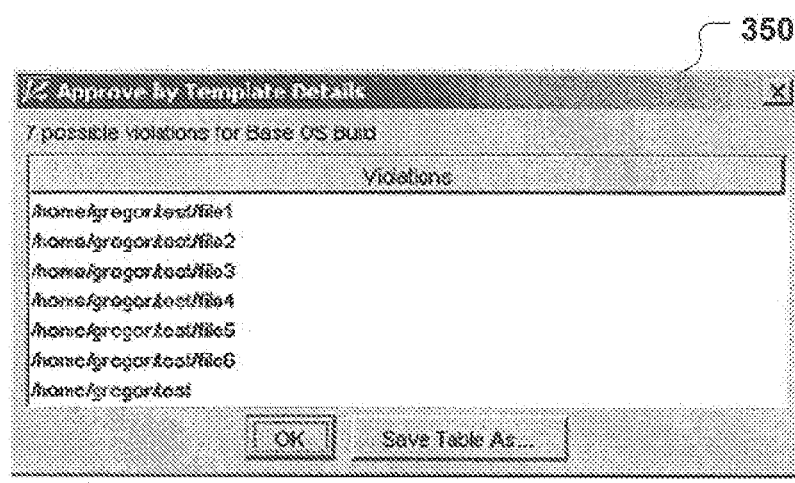

FIGS. 3a-3c illustrate various graphical user interface dialogs associated with specifying approval by template, provided by the one or more modules incorporated with the teachings of the present invention, in accordance with various embodiments of this invention. In other embodiments, different information may alternatively or additionally be displayed in such graphical user interface dialogs. In alternative other embodiments, other dialogs or their substantive equivalent may be provided. FIG. 3a illustrates "Approve by Template" dialog window 300, provided by the one or more modules, in accordance with an embodiment of this invention. "Approve by Template" dialog window 300 may include the following modes of determining how the template file is interpreted: "Object names and hashes must match" mode 306, "Only violated object names must match" mode 308, and "Only violated rule names must match" mode 310.

"Object names and hashes must match" mode 306 may comprise an operation where an opened violation will be approved if the template file has a violation in it with exactly the same object name and hash values, of the same type of violation: added, removed, or changed. "Only violated object names must match" mode 308 may comprise an operation that compares each violated object's name to see if the same name is in the template file. "Only violated rule names must match" mode 310 may comprise an operation where a violation is approved if it belongs to a rule where the template file also has a rule with the same name with violations.

For the illustrated embodiments, "Approve by Template" dialog window 300 may include Template Report File Name input field 302 for the selection of a particular file to be used as a template. Browse button 304 may allow a user to specify a report file or text file. When selecting a text file, it may be possible to specify the file's character encoding. "Approve by Template" dialog window 300 may include selection field 312, which may include accompanying text field 314 for specifying saving a file. In some embodiments, an Extensible Markup Language (XML) file may be selected for the results file, while in other embodiments, such an option may not be provided. After "Approve by Template" dialog window is dismissed, in some embodiments, if there are violations already checked, a message box prompt for whether they should be cleared first may be provided. In other embodiments, such a message prompt box may differ from the description above, or such a message prompt box may not occur, either at this stage or at all.

FIG. 3b illustrates a possible results dialog window 330 provided by the one or more modules for presentation of a report after approval is completed, in accordance with one embodiment of the invention. For the illustrated embodiments, results dialog window 330 may include Machine column 332, designating the machine compared with the template. Results dialog window 330 may include Possible column 334, designating the total number of violations for the machine. Results dialog window 330 may include Approved column 336, designating the number of violations that met the approval criteria. Results dialog window 330 may include Rejected column 338, designating the violations that failed to meet the approval criteria. Results dialog window 330 may include Not Found column 340, designating violations specified in the template but not found on the applicable machine. In various embodiments, results dialog window 330 may consist of buttons that allow for selection of a further dialog window. In some embodiments, machine column 332 may consist of machine names that, when selected, bring up a machine properties dialog (not shown) for that machine. In some embodiments, numbers in at least one of columns 334, 336, 338, and 340, in results dialog window 330 may comprise of buttons that, when selected, bring up a dialog window with further detail regarding the numeric value. For example, numeric button 342 may allow for the selection of such a dialog window.

FIG. 3c illustrates an example dialog window 350 that may result from the selection of numeric button 342 in FIG. 3b, in accordance with one embodiment of the invention. Dialog window 350 may display a list of the seven file names referred to by the numeric value of numeric button 342 in FIG. 3b.

Figure 4:
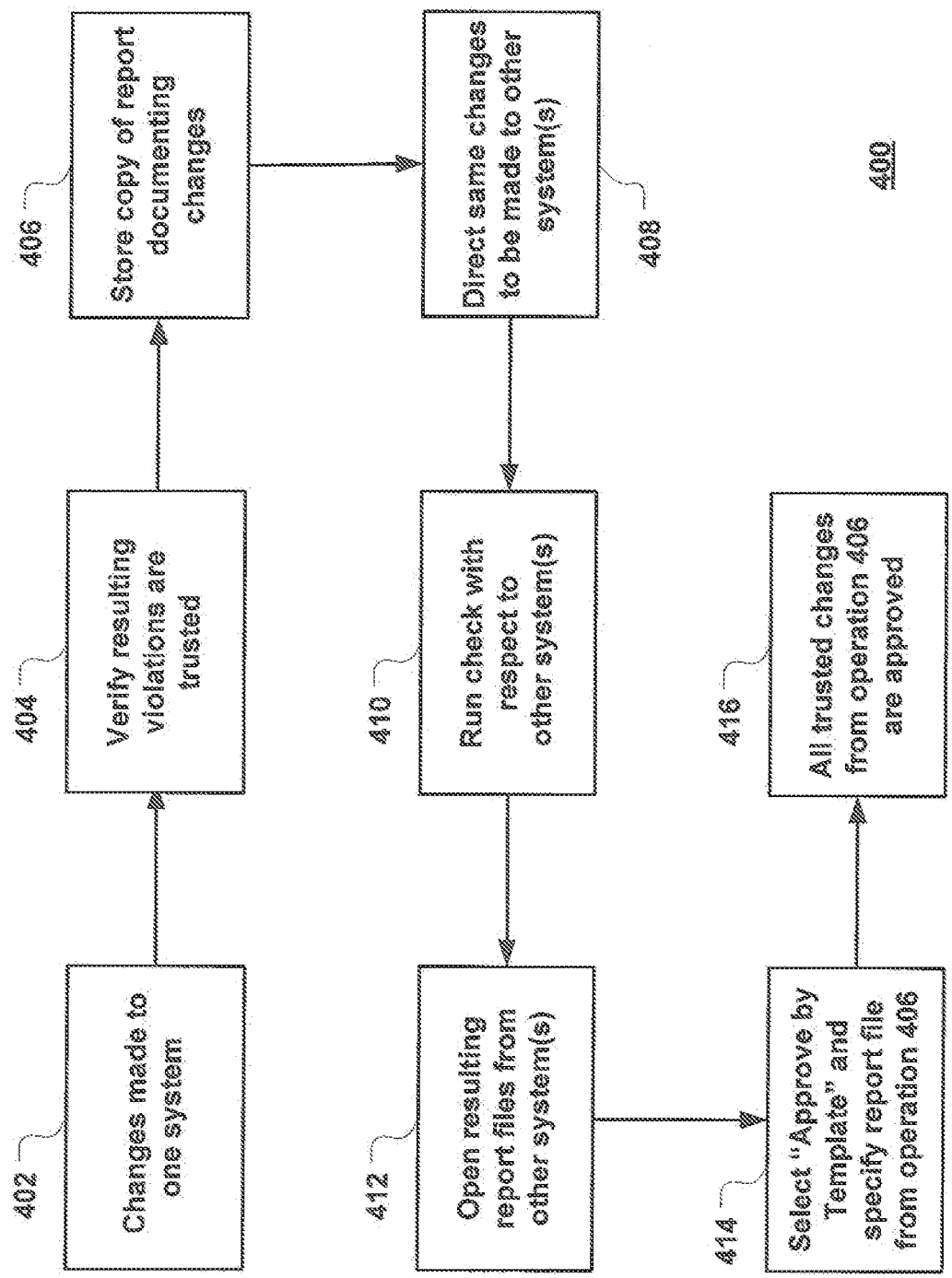
FIG. 4 illustrates parts of a workflow associated with using approval by template, in accordance with various embodiments of this invention.

FIG. 4 illustrates parts of a workflow 400 associated with using approval by template, in accordance with various embodiments of this invention. Various other embodiments may have various other workflows associated with them. In various embodiments, at least some of the operations illustrated in FIG. 4 may be automated. In other embodiments, more than one of the operations illustrated in FIG. 4 may not be automated. Workflow 400 may include operation 402, where changes may be made to one system. Workflow 400 may include operation 404, where the violations resulting from the changes are verified as trusted. An operation that stores a report documenting the changes may be included, as in operation 406. In various embodiments, operation 404 and/or operation 406 may be automated/facilitated by the one or more modules provided by the invention.

Workflow 400 may include operation 408, where the same changes made to the system in operation 402 are directed to be made to another system, or other systems. Workflow 400 may include operation 410, where a check is run with respect to the other system(s) changed in operation 408. Workflow 400 may include operation 412, where the resulting report files from the other system(s) may be opened. An operation that includes selecting an approval by template feature may be included, as illustrated by operation 414. Operation 414 may include or work in conjunction with specifying the report file from operation 406. Workflow 400 may include operation 416, where all trusted changes from operation 406 are approved. In various embodiments, one or more of operations 410, 412, and 414 may be automated/facilitated by the one or more modules provided by the invention.

FIG. 5 illustrates an example computer system suitable for use in association with automated change approval, in accordance with various embodiments of this invention. As shown, computer system 500 may include one or more processors 502 and may include system memory 504. Additionally, computer system 500 may include mass storage 506 in the form of one or more devices (such as diskette, hard drive, CDROM and so forth), input/output devices 508 (such as keyboard, cursor control and so forth) and communication interfaces 510 (such as network interface cards, modems and so forth). The elements may be coupled to each other via system bus 512, which may represent one or more buses. In the case where system bus 512 represents multiple buses, the multiple buses may be bridged by one or more bus bridges (not shown).

These elements each perform their conventional functions known in the art. In various embodiments, communication interfaces 510 may facilitate coupling of computing system 500 to a network, though which computing system 500 may be coupled to data processing devices 102, 104, 106, and so forth, as necessary. In various embodiments, computing system 500 may at least be partially incorporated in a data processing device, such as data processing devices 102, 104, and 106 of FIG. 1. System memory 504 and mass storage 506 may be employed to store a working copy and a permanent copy of the programming instructions implementing various aspects of the one or more earlier described modules of the present invention. The permanent copy of the programming instructions may be loaded into mass storage 506 in the factory or in the field, as described earlier, through a distribution medium (not shown), or through communication interface 510 from a distribution server (not shown). The constitution of these elements 502-512 are known, and accordingly will not be further described. In alternate embodiments, part or all of the one or more modules may be implemented in hardware, for example, using one or more Application Specific Integrated Circuits (ASICs) instead.

Thus, it can be seen from the above description, an automated method for facilitating management of a data processing environment is described. In various embodiments, the method may include facilitating creation of a first memorialization, in digital form, of first one or more changes made to a first data processing device of the data processing environment. In various embodiments, the method may further include facilitating creation of a second and a third memorialization, both in digital form, of second and third one or more changes made to a second and a third data processing device of the data processing environment, respectively. In various embodiments, the method may still further include facilitating automated approval of the second and third changes made to the second and third data processing devices, using the first, second and third memorializations. Other embodiments of the present invention may include, but are not limited to, apparatus adapted to facilitate practice of the above-described method.

While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. A computer-implemented method for facilitating management of servers in a data processing environment, comprising:
   generating a template of approved changes, wherein the approved changes are changes verified to have been made at a first server of the data processing environment, wherein the approved changes are represented in the template at least in part by hashes of first server data objects and by object names of the first server data objects;
   generating a record of second server data objects detected at a second server of the data processing environment, wherein the second server was directed to have the same changes made as the first server, and wherein the second server data objects are represented in the record at least in part by hashes of second server data objects and by object names of the second server data objects;
   detecting a failing second server data object that fails to have the same change as a corresponding first server data object, the detecting being performed by determining that an object name and hash in the template do not match an object name and hash in the record; and
   providing a remediation response to change the failing second server data object so that it matches the corresponding first server data object.

2. The method of claim 1, wherein the approved changes are detected by comparing one or more pre-change hashes of the first server data objects with corresponding one or more post-change hashes of the first server data objects.

3. The method of claim 1, wherein the first server is a test server and the second server is a production server.

4. The method of claim 1, further comprising displaying a report that identifies one or more failing second server data objects.

5. The method of claim 4, further comprising displaying a report that identifies one or more passing second server data objects, wherein a passing second server data object is a second server data object that has the same change as a corresponding first server data object.

6. The method of claim 1, wherein the hashes are generated by a SHA hashing technique.

7. The method of claim 1, wherein the hashes are generated by an MD5 hashing technique.

8. A system for facilitating management of a data processing environment, the system comprising:
   one or more system memories; and
   one or more processors programmed to:
      generate a template of approved changes, wherein the approved changes are changes verified to have been made at a first server of the data processing environment, wherein the changes made to the first server are represented in the template at least in part by hashes of first server data objects and by object names of the first server data objects;
      generate a record of second server data objects detected at a second server of the data processing environment, wherein the second server was directed to have the same changes made as the first server, and wherein the second server data objects are represented in the record at least in part by hashes of second server data objects and by object names of the second server data objects;
      detect a failing second server data object that fails to have the same change as a corresponding first server data object, the detecting being performed by determining that an object name and hash in the template do not match an object name and hash in the record; and
      provide a remediation response to change the failing second server data object so that it matches the corresponding first server data object.

9. The system of claim 8, wherein the approved changes are detected by comparing one or more pre-change hashes of the first server data objects with corresponding one or more post-change hashes of the first server data objects.

10. The system of claim 8, wherein the first server is a test server and the second server is a production server.

11. The system of claim 8, wherein the one or more processors are further programmed to display a report that identifies one or more failing second server data objects.

12. The system of claim 11, wherein the one or more processors are further programmed to display a report that identifies one or more passing second server data objects, wherein a passing second server data object is a second server data object that has the same change as a corresponding first server data object.

13. The system of claim 8, wherein the hashes are generated by a SHA hashing technique.

14. The system of claim 8, wherein the hashes are generated by an MD5 hashing technique.

15. One or more non-transitory storage devices storing computer-executable instructions which, when executed by a computer, cause the computer to perform a method, the method comprising:

generating a template of approved changes, wherein the approved changes are changes verified to have been made at a first server of a data processing environment, wherein the changes made to the first server are represented in the template at least in part by hashes of first server data objects and by object names of the first server data objects;

generating a record of second server data objects detected at a second server of the data processing environment, wherein the second server was directed to have the same changes made as the first server of the data processing environment, and wherein the second server data objects are represented in the record at least in part by hashes of second server data objects and by object names of the second server data objects;

detecting a failing second server data object that fails to have the same change as a corresponding first server data object, the detecting being performed by determining that an object name and hash in the template do not match an object name and hash in the record; and providing a remediation response to change the failing second server data object so that it matches the corresponding first server data object.

16. The one or more non-transitory storage devices of claim 15, wherein the approved changes are detected by comparing one or more pre-change hashes of the first server data objects with corresponding one or more post-change hashes of the first server data objects.

17. The one or more non-transitory storage devices of claim 15, wherein the first server is a test server and the second server is a production server.

18. The one or more non-transitory storage devices of claim 15, further comprising displaying a report that identifies one or more failing second server data objects.

19. The one or more non-transitory storage devices of claim 15, further comprising displaying a report that identifies one or more passing second server data objects, wherein a passing second server data object is a second server data object that has the same change as a corresponding first server data object.

20. The one or more non-transitory storage devices of claim 15, wherein the hashes are generated by a SHA hashing technique.

21. The one or more non-transitory storage devices of claim 15, wherein the hashes are generated by an MD5 hashing technique.

* * * * *